Oct. 11, 1960  J. B. ORR  2,955,955

PROTECTING POLYSTYRENE

Filed Nov. 5, 1957

INVENTOR.
John B. Orr

BY Green, McCallister & Miller
HIS ATTORNEYS

United States Patent Office 2,955,955
Patented Oct. 11, 1960

2,955,955
PROTECTING POLYSTYRENE

John B. Orr, Great Barrington, Mass., assignor to Sheffield Plastics, Inc., Sheffield, Mass., a corporation of Massachusetts Filed Nov. 5, 1957, Ser. No. 694,595

17 Claims. (Cl. 117—66)

This invention relates to preventing discoloration, poisoning, or disadvantageous change in the physical characteristics or nature of plastic material of the type of polystyrene.

A phase of my invention deals with an improved product involving a material containing polystyrene and having a protective coating thereon. Another phase deals with procedure and apparatus for making and applying improved coating material.

It is well recognized by those skilled in the art that many plastic materials will degrade physically and discolor on exposure over a period of time to sunlight and light emitted from, for example, fluorescent lighting tubes. I have discovered through experiment that such discoloration and degradation is, to a great extent, caused by ultraviolet light and that little is caused by light of a longer wave length than 3800 Angstroms. Also, further difficulty has been encountered in this connection from the standpoint of the poisoning of the plastic material when it is heated or maintained at a temperature in excess of 100° F. for long periods of time. I have found that this heat factor complicates the problem as does the fact that effective ultraviolet absorbers react chemically with the plastic base material and, in this sense, tend to weaken the base material.

It has thus been an object of my invention to extend the usefulness and life of polystyrene plastic material by making it resistant to solution decomposition or attack while providing it with a protective coating;

Another object has been to devise a solution to the problem heretofore presented in endeavoring to protect polystyrene from damage to it or its physical properties, in order that it may be advantageously employed where it is subjected to light or heat, for example, in providing a mounting structure for a fluorescent light, etc.;

Another object has been to provide a solution-applied coating for a polystyrene-containing material that will protect it from discoloration or poisoning due to light or heat to which it may be subjected in its utilization;

A further object of my invention has been to devise a new and improved treatment solution and method or means of application of it to a plastic material.

These and other objects of my invention will appear to those skilled in the art from the drawings, the specification and the claims.

Figure 1:
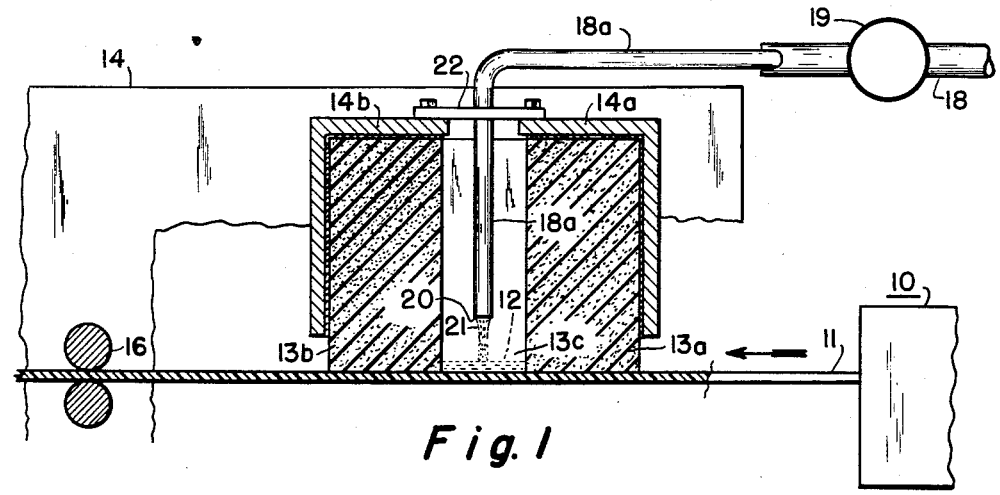
Figure 1 is a somewhat diagrammatic side view in elevation of a system employing principles of my invention and which applies a protective coating to a formed or shaped plastic material.

Others have worked on the idea of providing an ultraviolet light-absorbing material that may be advantageously incorporated with a plastic material as a protective coating on its surface to prevent the light from attacking and degrading the plastic material. I have found that such an absorber, to be economically practical, must be available in small amounts and must be able to absorb all the ultraviolet light for about six or more years. However, it is also highly important that the ultra-violet absorber must not, in itself, discolor the plastic or harm its physical properties, whether the plastic is to be used at room temperature or above.

Among the most effective ultraviolet absorbers for plastic materials are organic compounds of the class of benzo-phenones. However, when these compounds are incorporated in the plastic in amounts to be most effective, they tend to react chemically with the plastic to form compounds of objectionable color and lower physical properties. As a result, the effect of the ultraviolet light appears to be accelerated rather than diminished. This phenomenon is more effective with plastics with which I am concerned, namely, polystyrene plastic compounds. Even when the plastic is coated with the ultraviolet light-absorbing benzo-phenones such a poisoning effect will take place, particularly when the plastic is heated to a temperature in excess of about 100° F. for a long period of time.

By way of example of a poisoning action due to chemical reaction with an ultraviolet light-absorber, I have coated polystyrene with amyl acetate in which 10 percent by weight of benzo-phenones (such as contained in Uvinul 400) has been dissolved. When the coated piece was exposed to ultraviolet light for a period of some months at a temperature below 100° F., the stability of the plastic seemed to have improved. But, when the temperature was raised to about 120° F. during the exposure to such a light, the absorber lost its protective characteristics and, in fact, appeared to accelerate the discoloration of the plastic base material.

In another instance, I took two samples of polystyrene and coated them with 10 percent benzo-phenone (Uvinul 400) and amyl acetate solution. One sample was given one coat which increased its light stability by about 100 percent. A second sample was given two coats, but its light stability was less than that of the first sample. I further discovered that benzo-phenone absorbers and particularly, tri-hydroxy benzo-phenones, when present with polystyrenes in more than slight amounts, have a poisoning effect as far as light stability is concerned, and that elevated temperatures during exposure to light increase the poisoning effect.

Plastic of the class of polystyrene has been found to have physical properties that make it suitable for a number of important applications. However, its above-discussed tendency to become poisoned has tended to limit its application from the standpoint of electrical lighting installations when its properties of non-conductivity, etc., make it otherwise valuable. I have been able to so process plastic of this type, as it is being formed, and with a new and improved type of solution, such that it has all the desired properties and fully meets the problem that has heretofore been presented, and particularly where temperatures approach 100° F. or higher.

As above pointed out, benzo-phenone absorbers and particularly, tri-hydroxy benzo-phenones, have a poisoning effect as far as light stability is concerned which increases with an elevated temperature of about 100° F. or more. However, I have discovered that these absorbers may still be employed without their adverse effects by dissolving them in a light-stable plastic material, namely, methacrylic monomer to which has been added methacrylic polymer in solute form. Further and also highly importantly, I have discovered that such a solution can then be made insoluble to polystyrene by dilution with an alcohol that is predominantly ethyl alcohol. A solution made up and employed in accordance with my invention is highly effective as a polystyrene coating material, since it forms a protective coating which is, itself, light-stable and which prevents any chemical reaction between the light absorber (benzo-phenone) and the polystyrene.

Figure 2:
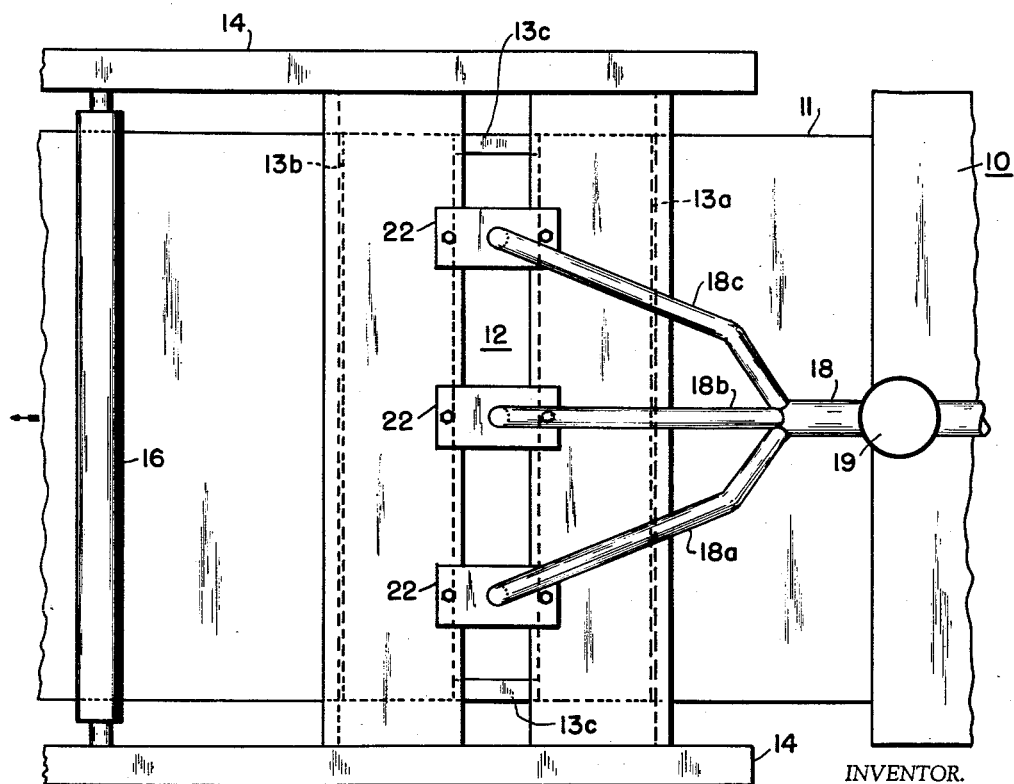
Figure 2 is a fragmental top plan view of the apparatus of Figure 1.

Another important factor is that it is definitely advantageous to coat the plastic with my solution, following the extrusion or other hot-forming operation involved, and before it has cooled below 110° F. This is true since increased temperature tends to accelerate the polymerization of the methacrylic monomer. Employing a system such as shown in Figures 1 and 2, the coating becomes "tack free" in less than a minute and, under normal conditions, becomes dry enough to handle after thirty seconds. This is important, not only from the standpoint of the improved resultant product, but to prevent "hold-up" or delay in production. The temperature of the polystyrene, as shaped or formed, should not be above 140° F., on the other hand, since polymerization tends to take place in the liquid bath of the solution between wiper means employed, in the application area or adjacent its point of application to the plastic shape. This hinders a smooth application and tends to cause the apparatus to "gum up."

In carrying out my invention, I have found that a benzo-phenone absorber may be dissolved in light-stable plastic material in the nature of an acrylic monomer to which has been added an acrylic polymer in solute form to provide a quick-drying coating which is light stable; that the coating solution, as it is applied and after application, prevents any chemical reaction between the benzophenone and the polystyrene material that is employed as the plastic base material; that by dilution with ethyl alcohol, the coating solution can be made insoluble to the polystyrene; and that the solution or coating, as applied, will provide the polystyrene with heat, light and a general stability, such that poisoning or adverse chemical reaction is avoided.

It may be noted that I have found that the acrylic polymer is not soluble in either ethyl or methyl alcohol of my solution and thus, that the alcohol does not act as a solvent, but as a protective means, from the standpoint of preventing a chemical reaction between the plastic material, as formed, and the solution. On the other hand, an acrylic polymer is soluble in methyl ether of ethylene glycol, as is polystyrene. Polystyrene is also soluble in ethylene glycol monomethyl ether, ethylene glycol monoethyl ether acetate and toluol. Thus, so-called solvents within which the polystyrene or plastic material may dissolve must be and are avoided in my solution and as it is effectively composed.

The methacrylic monomer of my solution is highly important, since it makes possible dissolving the methacrylic polymer in amounts up to 10 percent and, at the same time, by the addition of alcohol, makes a solution in which the polystyrene plastic is insoluble. This acrylic monomer, through polymerization, further provides additional methacrylic polymer to the coating which is advantageous. Substituted benzo-phenones are employed as light absorbers of high potency which I have found to be far superior to others, and at least in my solution, are employed with their bad features eliminated and their good features retained.

As an example of the preparation and employment of a solution in accordance with my invention, I have made one containing 76 grams of methacrylic monomer in which 4 grams of methacrylic polymer were dissolved. To this I added 86 grams of ethyl alcohol and 4 grams of methyl alcohol. I then added 8 grams of a benzo-phenone, such as Uvinul 400. It may be noted that Uvinul 400 is the trade name of a convenient, commercially available source of substantially pure substituted benzo-phenones as supplied by the Antara Chemicals Company. Samples of medium impact polystyrene sheet were coated and on test, it was determined that absorption of 75 percent of the light below 4000 Angstroms, as emitted by a mercury arc tube, was accomplished. In addition, samples were subjected to ultraviolet light from a fluorescent tube for a period of four months and showed more than twice the light stability at 120° F., as compared to uncoated samples.

I also made a solution containing 1.5 liters of methacrylic monomer in which I dissolved 150 grams of methacrylic polymer. To this was added 1.8 liters of 90 percent ethyl alcohol and 5 percent methyl alcohol. I then dissolved 71 grams of Uvinul 400. Samples of medium impact polystyrene sheet were than coated with this solution until 90 percent of the ultraviolet light below 4000 Angstroms from a mercury arc light source was absorbed. I found that the light stability of these samples was increased about 5½ times.

In addition, I have found that my solution cannot very well be sprayed with conventional air spray apparatus because it tends to polymerize in the air stream of a spray gun into thread-like strings. The same difficulty was encountered with an electrical gun. However, I devised apparatus that is highly successful which drops the solution as the strip moved between wipers, such as foam rubber sponges. This works well for sheet as well as contour shapes.

I found that the thickness and concentration of the benzo-phenone in the final coating can be controlled by the amount of methacrylic polymer used in the solution. Further, the application can be used successfully in a continuous process with plastic forming or hot extrusion equipment, in such a way that the sheet or contour shape is coated continuously and automatically on the extrusion string or line.

Further, by way of example, using a solution containing 10 percent of the methacrylic polymer and 9 percent of a benzo-phenone (such as Uvinul 400), a coating of about .0003 of an inch thickness will screen out substantially all of the 3650 Angstrom mercury band of the mercury spectrum.

As to the benzo-phenone, I have discovered that the percentage should not exceed 9 percent, since above this it tends to retard polymerization of the methacrylic polymer in methacrylic monomer solution, although it is economically advantageous to use as high a concentration of the benzo-phenones as possible to obtain a good ultraviolet protection with a light coating.

The percentage of alcohol must be at least 45 percent of an ethyl type or in which ethyl predominates, in order to prevent solubility of polystyrene in the coating solution. However, if the alcohol is increased above 55 percent, polymerization of the acrylic monomer starts to take place in the solution. Thus, in accordance with my invention, the solution should contain:

Methacrylic monomer—about 35 to 40 percent
Methacrylic polymer—about 5 to 10 percent
Benzo-phenone (such as Uvinul 400)—about 2 to 9 percent
Alcohol—about 45 to 50 percent The alcohol may be in the nature of 95 percent ethyl and 5 percent methyl.

So far as known, this is the only solution of such a nature which will give adequate protection over extended periods of time for temperatures in excess of 100° F., as well as which can be economically applied and dried on the production line of the plastic material. The coating will in no way damage the polystyrene plastic material. An optimum formula for providing a coating in accordance with my invention is as follows:

| | Pounds |
|---|---|
| Methyl methacrylate monomer $CH_2CCH_3COOCH_3$ (solution) | 4.2 |
| Methyl methacrylate polymer (solute) | .84 |
| Nearly pure substituted benzo-phenones, as provided by Uvinul 400 | 1.0 |
| Alcohol solution consisting of 95 percent ethyl and 5 percent methyl alcohol | 5.4 |

It may be noted that Uvinul 400 is a registered trade name of a highly purified organic ultraviolet light absorber consisting of substituted benzo-phenones containing only traces of inorganic salts. It is effective as a light absorber within a range of 200 millimicrons (2000 Angstrom units) to 250 to 280 millimicrons. It is soluble in most plastics and plasticizers. It may be further noted that the percentages employed herein are all percentages by weight. The methacrylate or acrylate monomers and polymers to which reference is made are methyl methacrylates.

A method by which I have determined solubility of polystyrene in coating mixes is as follows: A polystyrene monofilm of not more than .001 to .002 inch thickness or diameter is immersed in the coating solution and is allowed to remain there for periods of ten minutes. On withdrawal from the solution and during drying, the film or monofilament is placed under tension. If the tensile strength of any of the specimens has been decreased by the action of the solution, this indicates that the polystyrene film or monofilament is soluble therein. On the other hand, if there is no apparent decrease in tensile strength, this indicates that there has been no attack on the styrene by the solution.

In the drawings, see Figures 1 and 2, I have shown how a coating of my invention may be applied to formed or shaped plastic material. In these figures, a strip sheet 11 is shown moving in the direction of the arrows at a speed of about 1 to 20 feet per minute from a hot-forming apparatus 10, such as an extruder. The location of the station, area or apparatus for applying the coating is such that it is applied when the plastic sheet is at a temperature of about 110° to 140° F., but basically, while the sheet is still warm from its forming or shaping operation and before it has cooled down to room temperature from such operation.

In these figures, 11 indicates a formed plastic sheet which is being pulled continuously-forwardly, longitudinally of its length, from right to left, by a pair of driven pinch rolls 16. During such movement, the plastic material passes a treatment zone, area or station 12 to which the coating solution 20 is supplied and at which the solution is applied to the material 11. The zone or station 12 is defined by a pair of opposed cross-extending side walls and longitudinally-extending end walls 13a, 13b and 13c of wiper material. The wipers may be of a suitable resilient material such as foam rubber, felt, etc., that is resistant to deterioration by a chemical reaction with the coating solution. Angle-shaped metal support or angle iron members 14a and 14b mount and carry the respective wipers 13a, 13b and 13c; the latter are secured to the former by any suitable securing means, such as cement, rivets, etc. The angle irons 14a and 14b project transversely of the strip 11 or of its longitudinal direction of advance and are secured to side frame or vertical support members 14 that lie along opposite edges of the strip.

The solution of my invention is supplied by an overhead conduit or main 18 through a motor driven circulating pump 19 and suitable branch lines 18a, 18b and 18c to drop upon the plastic sheet 11, transversely of its length, as it is being moved and within an area 12 that is defined forwardly and backwardly by the wipers 13a and 13b, and longitudinally or endwise by the wipers 13c. This area may be open, as shown in Figure 1, where a stream 21 of the coating solution is shown leaving a lower outlet or nozzle end portion 20 of a typical branch line 18a, and flowing into the area 12 to flood the surface of the plastic sheet 11. A uniform and full application of the coating is attained by the wipers and particularly, the wipers 13a and 13b.

As previously mentioned, under my operating conditions, the resultant coating is "tack-free" in less than about one minute. In fact, under normal operation, it is dry enough to handle in 30 seconds. This is highly important, since the plastic material, after forming and coating, can be handled without a period of delayed production. In other words, employing the system shown in these figures, the material 11, on leaving the coating apparatus, needs only a slight space before the next station, whether it be a pinch roll pass or a shearing operation, to provide it with about 30 seconds of drying time.

As the coating solution dries on the plastic material 11 and as the polymerization of the acrylic monomer takes place, the concentration of styrene-dissolving monomer does not increase due to the evaporation of the alcohol. This is highly important, since if the alcohol evaporated more rapidly, than the polymerization took place, a solution might be left on the polystyrene in which it is soluble. This would cause a poisoning of the polystyrene due to contact with the ultraviolet absorber. In other words, the solution is so proportioned that the alcohol is added to a solution of acrylic monomers and polymers having a concentration of the acrylic monomers, such that during drying, the solution is maintained insoluble to the polystyrene.

Summarized briefly, I have been able to greatly increase the light stability of a polystyrene containing plastic by coating it with a benzo-phenone containing material in which the polystyrene is insoluble, particularly as effected by a solution of alcohol added to a solution of acrylic monomers and polymers. Further, the concentration and thickness of the coating may be varied by varying the concentration of the acrylic polymer in it. The actual application is effected by sprinkling or pouring the solution on the plastic and then wiping it with a suitable wiper such as a rubber sponge, felt, etc., that is, itself, insoluble in the solution.

What I claim is:

1. A method of coating polystyrene-containing plastic material which comprises, providing an ultraviolet light-absorbent heat-stable coating solution containing methacrylic monomer and polymer, coating a surface of the plastic material with the solution, and drying the solution on the surface while maintaining the concentration of methacrylic monomer insoluble to the polystyrene.

2. A method as defined in claim 1 wherein the plastic material is maintained at a temperature of about 110° to 140° F. while coating it with the solution.

3. A method as defined in claim 1 wherein the concentration of methacrylic monomer is maintained insoluble to the polystyrene by adding a solution of ethyl and methyl alcohol to the methacrylic monomer and polymer solution.

4. A method as defined in claim 3 wherein the methacrylic monomer and polymer solution is made light-absorbent by adding a benzo-phenone and in which the polystyrene is made heat and light stable by the methacrylic monomer and polymer of the solution.

5. A method of light-stabilizing polystyrene-containing plastic material which comprises, preparing a benzo-phenone and methacrylic monomer and polymer containing solution in which polystyrene is insoluble, and applying the solution to the plastic material by wiping it on the material while the material is at a temperature of about 110° to 140° F. while maintaining the concentration of methacrylic monomer insoluble to the polystyrene.

6. A method as defined in claim 5 wherein, the plastic material is first hot-formed before the solution is applied, and the application of the coating solution is effected while the plastic material is still hot from its forming operation.

7. A method of coating polystyrene-containing plastic material which comprises, hot forming the plastic material into a shape, providing a light-absorbent, temperature-stable and non-polystyrene-dissolving and non-poisoning solution containing methacrylic monomer and polymer, and applying the solution to a surface of the shape while the shape is still hot from the forming operation and within a range of about 110° to 140° F. while maintaining the concentration of methacrylic monomer insoluble to the polystyrene.

8. A method as defined in claim 7 wherein the solution is applied by dropping it within a segregated area and wiping it on the surface of the shape.

9. A plastic shape containing polstyrene and having an adherent coating thereon that is light and heat protective and insoluble of the polystyrene, said coating comprising a dried-on solution of a major proportion by weight of methacrylate monomer and a substantial but minor proportion by weight of polymer, substantially pure benzo-phenone, and alcohol.

10. In a system for continuously making a polystyrene strip and applying a self-drying and adherent protective ultraviolet light-absorbing and non-discoloring coating thereto which comprises, an end station, said end station having a hot-forming means to progressively form a longitudinal base strip of polystyrene material, an opposite end station longitudinally spaced from said first-mentioned end station to grip the strip and continuously longitudinally advance it from said first-mentioned end station, a coating solution applying station longitudinally spaced between said end stations and at a longitudinally advanced position with respect to said first-mentioned end station at which the strip has a temperature of 110° to 140° F., said applying station having means fully open at its bottom end to define a dam with progressively presented upper face portions of the continuously moving strip, means at said applying station for supplying a quick-drying coating solution containing methacrylic monomer and polymer, ethyl and methyl alcohol and a benzo-phenone in at least one stream downwardly into the dam at a sufficient rate to provide a sufficient quantity to submerge the upper face portions of the strip while the strip is being moved continuously along said applying station, said dam-defining means having enclosing upright wiping means providing a resilient wiping contact with the upper face portions of the strip for wiping the solution on the strip to leave a relatively thin coating thereon, and said opposite end station having an advance position with respect to said applying station at which the coating on the strip has dried.

11. A method of coating polystyrene-containing plastic material which comprises, hot forming the plastic material into a shape, providing a light-absorbent temperature-stable and non-styrene-dissolving and non-poisoning solution containing about 35 to 45% acrylic monomers and about 5 to 10% acrylic polymers, about 2 to 9% of light-absorbent benzo-phenones, and about 45 to 50% of alcohol, all by weight; and applying the solution to a surface of the shape and drying it thereon at a temperature of about 110 to 140° F.

12. A method of coating polystyrene-containing plastic material which comprises, hot forming the plastic material into a shape, providing a light-absorbent temperature-stable and non-polystyrene-dissolving and non-poisoning solution, and applying the solution to a surface of the shape while the shape is still hot from the forming operation and within a range of about 110° to 140° F.; the solution containing about 35 to 45% acrylic monomers and about 5 to 10% acrylic polymers, about 2 to 9% of light-absorbent benzo-phenones, and about 45 to 55% of alcohol of which ethyl predominates, all by weight.

13. A plastic shape containing polystyrene and having a heat and light-protective and light-absorbing coating which is applied as an ultra-violet light-absorbent heat-stable solution containing a major proportion by weight of methacrylic monomer and a substantial but minor proportion by weight of polymer, and is dried on the shape as a plastic coating while maintaining the concentration of methacrylic monomer insoluble to the polystyrene.

14. A plastic shape containing polystyrene and having an adherent coating thereon that is ultra-violet light-absorbent and heat-stable and light-protective as to the polystyrene, said coating comprising a dried-on solution which contains a major proportion by weight of methacrylic monomer and a substantial but minor proportion by weight of polymer in a concentration such that the methacrylic is insoluble to the polystyrene, and said coating having the characteristic of maintaining stability of the polystyrene at temperatures in excess of 100° F.

15. A plastic shape as defined in claim 14 wherein the solution contains alcohol for maintaining the concentration of methacrylic monomer insoluble of the polystyrene.

16. A plastic shape containing polystyrene and having an adherent coating thereon that is light and heat protective and insoluble of the polystyrene, said coating comprising a dried-on solution of methacrylate monomer and polymer, substantially pure benzophenone and alcohol; the ingredients of the coating solution having about 35 to 45% by weight of methacrylate monomer, about 5 to 10% by weight of methacrylate polymer, about 2 to 9% by weight of substantially pure benzo-phenones, and about 45 to 50% by weight of a mixture of 95% ethyl and 5% methyl alcohols.

17. A plastic shape containing polystyrene and having an adherent coating thereon that is light and heat protective and insoluble of the polystyrene, said coating comprising a solution of a major proportion of methacrylic monomer and a substantial but minor proportion of polymer, substantially pure benzo-phenone, and alcohol; and the solution having the characteristic of quickly drying within 30 seconds to a non-tacky state when applied to plastic shape when the shape has a temperature of about 110° to 140° F.

References Cited in the file of this patent
UNITED STATES PATENTS

| | | |
|---|---|---|
| 459,269 | Collins | Sept. 8, 1891 |
| 2,022,322 | Pelton | Nov. 26, 1935 |
| 2,486,971 | Ohlmann | Nov. 1, 1949 |
| 2,578,665 | Bjorksten et al. | Dec. 18, 1951 |
| 2,730,991 | Baughan | Jan. 17, 1956 |